(12) United States Patent
Akgun et al.

(10) Patent No.: US 7,130,625 B2
(45) Date of Patent: Oct. 31, 2006

(54) SYSTEM AND METHOD FOR A UNIVERSAL WIRELESS ACCESS GATEWAY

(75) Inventors: Ali Akgun, Chicago, IL (US); Michael Borella, Naperville, IL (US)

(73) Assignee: 3Com Corporation, Marlborough, MA (US)

( * ) Notice: Subject to any disclaimer, the term of this patent is extended or adjusted under 35 U.S.C. 154(b) by 722 days.

(21) Appl. No.: 10/186,957

(22) Filed: Jul. 1, 2002

(65) Prior Publication Data

US 2004/0029585 A1     Feb. 12, 2004

(51) Int. Cl.
*H04Q 7/20* (2006.01)

(52) U.S. Cl. ............ 455/422.1; 455/466; 455/439; 455/450; 455/445

(58) Field of Classification Search ......... 455/422.1, 455/450, 466
See application file for complete search history.

(56) References Cited

U.S. PATENT DOCUMENTS 6,374,112 B1   4/2002   Widegren et al. ........... 455/452

OTHER PUBLICATIONS

CommWorks a 3Com Company, "3 G Data System For cdma 2000 Wireless Networks", 2001.
IEEE Std 802 11a-1999, "Part 11 : Wireless LAN Medium Access Control (MAC) and Physical Layer (PHY) Specifications—High Speed Physical Layer in the 5 GHz Band", IEEE Computer Society. 1999.
IEEE Std 802.11b-1999, "Part 11: Wireless LAN Medium Access Control (MAC) and Physical Layer (PHY) Specifications: Higher-Speed Physical Layer Extension in the 2.4 GHz Band", IEEE Computer Society, Sep. 16, 1999.
IEEE std 802.1X-2001, "IEEE Standard For Local Metropolitan Area Networks—Port-Based Network Access Control", IEEE Computer Society, Jun. 14, 2001.
IEEE Std 802.3. 2000 Edition, "Part 3: Carrier Sense Multiple Access With Collision Detection (CSMA/CD) Access Methods and Physical Layer Specifications", IEEE Computer Society 2000.
IEEE Std 802.11, "Information Technology-Telecommunications and Information Exchange Between Systems—Local and Metropolitan Area Networks Specific Requirements", 1999 edition.
Congdon, et al. "IEEE 802.1X Radius Usage Guidelines"; Internet Engineering Task Force (IETF), Internet-Draft <draft-congdon-radius-8021x20.txt>, Jun. 17, 2002.
Internet Engineering Task Force (IETF), Requests For Comments (RFC) 1661, "The Point-To-Point Protocol (PPP)", Jul. 1994.

(Continued)

*Primary Examiner*—Lester G. Kincaid
*Assistant Examiner*—Fred A. Casca
(74) *Attorney, Agent, or Firm*—McDonnell Boehnen Hulbert & Berghoff LLP

(57) ABSTRACT

The present embodiments provide a system and method for seamlessly roaming between different wireless access technologies. In an exemplary embodiment, a universal wireless access gateway (UWAG) may include a shared component and a first environment access module (EAM) that communicates with the shared component to enable access to a first network using a first wireless access technology. Additionally, the UWAG may include a second EAM that communicates with the shared component. The second EAM and shared component may enable access to a second network using a second wireless access technology that differs from the first wireless access technology. An exemplary data structure including various pointer blocks and data blocks may also be provided for switching between different wireless access technologies.

31 Claims, 6 Drawing Sheets

OTHER PUBLICATIONS

Internet Engineering Task Force (IETF), Requests For Comments (RFC) 1662, "PPP In HDLC-Like Framing", Jul. 1994.

Internet Engineering Task Force (IETF), Requests For Comments (RFC) 2002, "IP Mobility Support", Oct. 1996.

Internet Engineering Task Force (IETF), Requests For Comments (RFC) 2003, "IP Encapsulation Within IP", Oct. 1996.

Internet Engineering Task Force (IETF), Requests For Comments (RFC) 2004, "Minimal Encapsulation Within IP", Oct. 1996.

Internet Engineering Task Force (IETF), Requests For Comments (RFC) 2005, "Applicability Statement For IP Mobility Support", Oct. 1996.

Internet Engineering Task Force (IETF), Requests For Comments (RFC) 2006, "The Definition of Managed Objects for IP Mobility Support Using SMIv2", Oct. 1996.

Internet Engineering Task Force (IETF), Requests For Comments (RFC) 2138, "Remote Authentication Dial In User Service (RADIUS)", Apr. 1997.

Internet Engineering Task Force (IETF), Requests For Comments (RFC) 2139, "RADIUS Accounting", Apr. 1997.

Internet Engineering Task Force (IETF), Requests For Comments (RFC) 2284, "PPP Extensible Authentication Protocol (EAP)", Mar. 1998.

Internet Engineering Task Force (IETF), Requests For Comments (RFC) 2516, "A Method For Transmitting PPP Over Ethernet (PPPoE)", Feb. 1999.

Internet Engineering Task Force (IETF), Requests For Comments (RFC) 2865, "Remote Authentication Dial In User Service (RADIUS)", Jun. 2000.

Internet Engineering Task Force (IETF), Requests For Comments (RFC) 2866, "RADIUS Accounting", Jun. 2000.

Internet Engineering Task Force (IETF), Requests For Comments (RFC) 2867, "RADIUS Accounting Modification For Tunnel Protocol Support", Jun. 2000.

DRAFT Supplement to STANDARD [for] Information Technology-Telecommunications and information exchange between systems-Local and metropolitan area networks-Specific requirements-Part 11: Wireless LAN Medium Access Control (MAC) and Physical Layer (PHY) specifications: Further Higher-Speed Physical Layer Extension in the 2.4 GhzBand, IEEStd 802.11g/D6.1, Jan. 2003 (Supplement to ANSI/IEEE Std 802.11 1999(Reaff 2003)), pp. 1-58.

PCT International Search Report for 3Com Corporation et al., in PCT/US03/20529, dated Jun. 30, 2003.

SYSTEM AND METHOD FOR A UNIVERSAL WIRELESS ACCESS GATEWAY

FIELD OF INVENTION

This invention relates to wireless telecommunications networks. More specifically, it relates to a system and method for switching between multiple wireless access technologies in a universal wireless access gateway.

BACKGROUND OF INVENTION

Wireless technology has become an important part of modern communications. From cellular phones to personal digital assistants, wireless technology enables devices to communicate with networks and other devices while in a mobile setting. Additionally, as wireless networks continue to grow and mobile devices continue to become more popular, it is expected that the importance and utility of wireless technology will increase as well.

A number of access technologies have been established for wireless communications, such as Code-Division Multiple Access (CDMA), Global System for Mobile Communications (GSM), Institute for Electrical and Electronics Engineers (IEEE) 802.11, Time-Division Multiple Access (TDMA), and so forth. Unfortunately, present wireless networks typically do not allow for mobile devices to communicate using multiple wireless access technologies. This limitation may severely restrict the utility of a mobile device, and prevent the mobile device from operating when a network that employs a given wireless access technology is not available.

Accordingly, it is desirable to have a system and method for wireless communications that overcomes the above deficiencies associated with the prior art. This may be achieved by using a universal wireless access gateway to allow for switching of wireless access technologies employed by a mobile node.

SUMMARY

The present embodiments provide a system and method for seamlessly roaming between different wireless access technologies. An exemplary method may include providing a universal wireless access gateway with a shared component and a first environment access module to establish a first wireless connection with a first network. Additionally, the method may include communicating with the first network along the first wireless connection using a first wireless access technology. Furthermore, the method may also include providing the universal wireless access gateway with a second environment access module. Additionally, the method may include establishing a second wireless connection between the universal wireless access gateway and a second network using the shared component and the second environment access module. The exemplary method may also include communicating with the second network along the second wireless connection using a second wireless access technology that differs from the first wireless access technology.

The present application also provides an exemplary universal wireless access gateway. The universal wireless access gateway may include a shared component and a first environment access module that communicates with the shared component to enable access to a first network using a first wireless access technology. Furthermore, the universal wireless access gateway may also include a second environment access module that communicates with the shared component to enable access to a second network using a second wireless access technology that differs from the first wireless access technology.

Additionally, the present application provides another exemplary method for seamlessly roaming between different wireless access technologies within a universal wireless access gateway. The exemplary method may include linking an active context pointer to a first context data block storing data associated with a first wireless access technology. Furthermore, the method may include communicating with a first network using the first wireless access technology. The method may also include receiving data associated with a second wireless access technology from a second network. Also, the method may include storing the data associated with the second wireless access technology within a second context data block and linking a transition context pointer to the second context data block. Furthermore, the method may also include switching the active context pointer and the transition context pointer and communicating with the second network using the second wireless access technology.

In another exemplary embodiment described in the present application, a universal wireless access gateway may have a memory for storing data for access by an application program that is executed on a data processing system. The memory may store a data structure that includes information resident in a database used by the application program. Additionally, the data structure may include a management pointer block having an active context pointer and a transition context pointer. Also, the data structure may have a first context data block storing a first data pointer block that links to a first environment access module data block. Additionally, the active context pointer may link to the first context data block. The data structure may also include a second context data block storing a second data pointer block that links to a second environment access module data block, and the transition context pointer may link to the second context data block.

Another exemplary method described in the present application may include linking an active context pointer to a first context data block associated with a first wireless access technology. Additionally, the method may include providing the universal wireless access gateway with a shared component and a first environment access module to establish a first wireless connection with a first network. Furthermore, the method may include communicating with the first network along the first wireless connection using the first wireless access technology. Also, the method may also include providing the universal wireless access gateway with a second environment access module that is linked to the shared component. Additionally, the method may include linking a transition context pointer to a second context data block corresponding to a second wireless access technology that differs from the first wireless access technology. Furthermore, the method may also include switching the active context pointer and the transition context pointer. Also, the method may include establishing a second wireless connection between the universal wireless access gateway and a second network using the shared component and the second environment access module. The method may also include communicating with the second network along the second wireless connection using the second wireless access technology.

DETAILED DESCRIPTION

I. Exemplary Wireless Telecommunications Network

In an exemplary embodiment, a wireless telecommunications network may include a universal wireless access gateway (UWAG) that enables a mobile node to roam seamlessly between networks that use different wireless access technologies. In an exemplary scenario, the UWAG may have a shared component that includes generic functionality common to a number of different wireless access technologies. Additionally, the UWAG may also include environment access modules (EAMs) that include functionality that is specific to the type of wireless access technology being used. To illustrate, an exemplary UWAG may have a CDMA EAM that has functionality specific to CDMA. Thus, the EAMs may serve as pluggable modules to the generic functions within the shared component.

Figure 1:
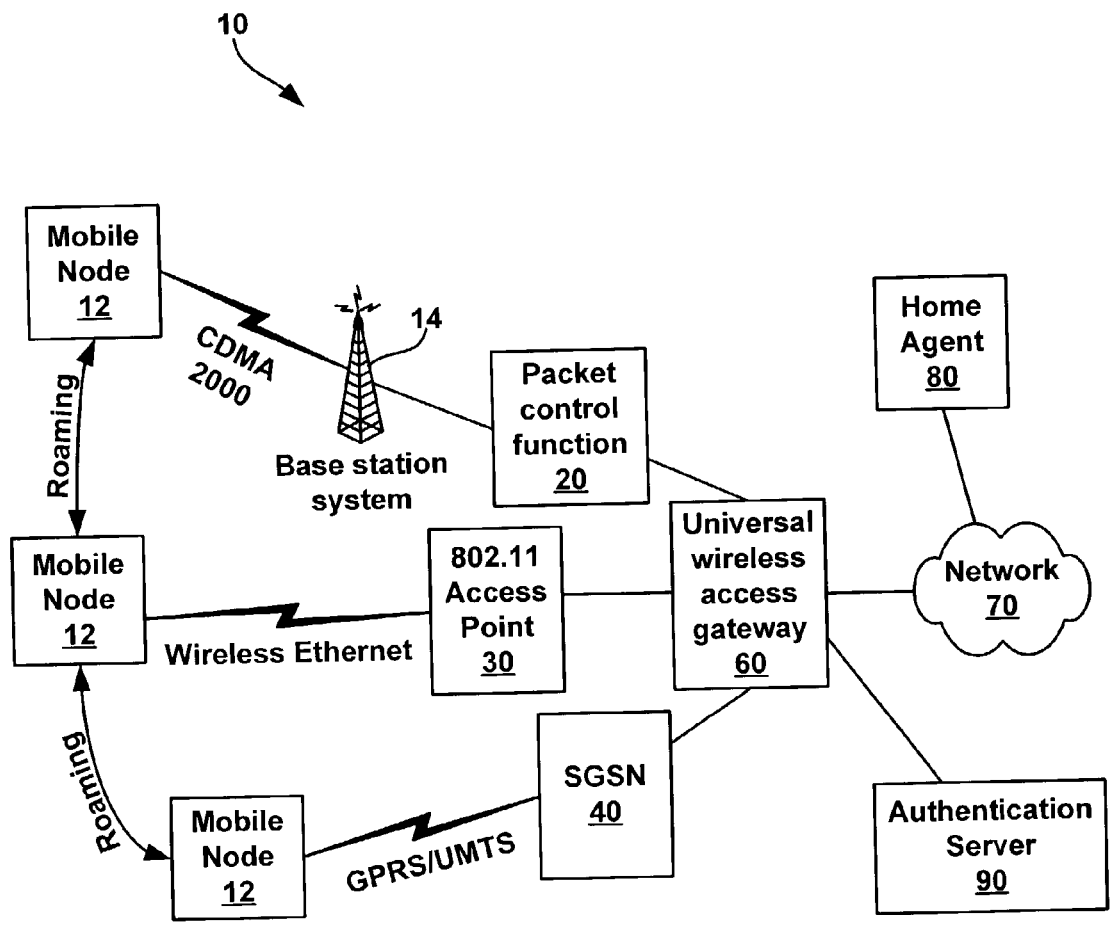
FIG. 1 shows a block diagram of an exemplary wireless telecommunications network.

Turning now to the drawings, FIG. 1 illustrates an exemplary wireless telecommunications network 10, where a mobile node 12 may communicate with a network 70 via a UWAG 60. Additionally, the network 70 may communicate with a home agent 80, and the mobile node 12 may communicate with an authentication server 90 via the UWAG 60. Other intermediate components shown in FIG. 1 will be described in more detail shortly. It should be understood that the wireless telecommunications network 10 may alternatively include more or fewer components, such as additional UWAGs or authentication servers.

A. Exemplary Mobile Node

In the present embodiment, the mobile node 12 may be any type of wireless device, such as a cellular phone, laptop computer, portable-facsimile device, personal digital assistant (PDA), and/or two-way pager. Additionally, the mobile node 12 may include a variety of different wireless transceivers for sending and receiving data using any number of different wireless access technologies. For example, in the present embodiment, the mobile node 12 may communicate with the UWAG 60 via access technologies such as Code-Division Multiple Access 2000 (CDMA2000), IEEE 802.11, Global Packet Radio Service (GPRS), and/or Universal Mobile Telecommunications System (UMTS), all of which will be described in more detail later. Additionally, it should be understood that in alternate embodiments, the mobile node 12 may employ other types of wireless access technologies within the wireless telecommunications network 10. For example, the mobile node 12 may alternatively use technologies such as Time-Division Multiple Access (TDMA), or Frequency Division Multiple Access (FDMA) for wirelessly sending and receiving data. Additionally, it should be noted that although only a single roaming mobile node 12 is depicted in FIG. 1, any number of mobile nodes may alternatively communicate with the UWAG 60 within the wireless telecommunications network 10.

B. Exemplary Network

Although the network 70 is depicted as a single entity in FIG. 1, it should be understood that a wide variety of network types may be included within the network 70. For example, the network 70 may include a CDMA2000 network, an IEEE 802.11 network, and/or a GPRS/UMTS network, all of which may or may not be in communication with one another. Furthermore, the network 70 may include a combination of network types. For example, in an alternate embodiment, the network 70 may include a combination of an IEEE 802.11 local area network (LAN) and a wireline IEEE 802.3 Ethernet network.

C. Exemplary Home Agent

The home agent 80 may be a registration server that the mobile node 12 may remotely access in order to communicate with the network 70. Additionally, the home agent 80 may communicate with the UWAG 60, and include a timeout mechanism (not shown) in order to timeout a connection to the UWAG 60 if it is not responsive. In the present embodiment, the home agent 80 may be installed at a central office (CO) of a telephone company. Further, the home agent 80 may be capable of connecting and disconnecting thousands of user sessions from various mobile nodes. An exemplary home agent 80 for use in the present embodiment may be the Total Control Enterprise Network Hub incorporating an integral general purpose computing platform, e.g., the HiPerArc™ card, both of which are commercially available from the present assignee, 3COM Corporation. This computing platform card may allow the home agent 80 to run a commercially available stand-alone operating system, such as a custom operating system designed for the exemplary wireless telecommunications network 10.

Additionally, the home agent 80 may utilize other remote access software products, such as RADIUS (Remote Authentication Dial In User Service) or DIAMETER software. These protocols may be utilized during communication with the authentication server 90. Further, previously described connection mechanisms may also utilize the RADIUS protocol, which is described in Internet Engineering Task Force (IETF) Request for Comments (RFC) 2865, "Remote Authentication Dial In User Service (RADIUS)", the contents of which are specifically incorporated in its entirety herein by reference. It should be understood that a number of other commercially available or known home agents and connection protocols may also be utilized with the present embodiment.

D. Exemplary Authentication Server

The authentication server 90 may be any type of server or computing device that performs authentication and access authorization for the mobile node 12 when connecting to the network 70. Consistent with the RADIUS protocol, the authentication server 90 may receive an access-request packet from the UWAG 60 on behalf of the mobile node 12, and the authentication server 90 may respond with an access-accept packet or an access-reject packet (packets not shown). The format of access-request packets, access-reject packets, and access-accept packets is described within RFC 2865.

The mobile node 12 may be authenticated through a variety of different mechanisms. For example, the mobile node 12 may authenticate itself using a username/password scheme with the authentication server 90. If the authentication server 90 determines that the username and password are not valid, the requested connection may be rejected with an access-reject packet. Alternatively, if the username and password are valid, the authentication server 90 may enable the mobile node 12 with an access-accept packet to access the network 70 via the UWAG 60. If the authentication server 90 is unavailable or unable to process the username and password that it has received, it may ask the UWAG 60 to try a connection with another authentication server.

II. Exemplary Communication Using Different Wireless Access Technologies

In the present embodiment, the mobile node 12 depicted in FIG. 1 may communicate using CDMA2000, IEEE 802.11, GPRS, and/or UMTS, though other wireless access technologies may alternatively be utilized. For more information on any of these access technologies, one can refer to U.S. patent application Ser. No. 10/186,810, (MBHB Case No. 02-048-A), entitled "System and Method for Roaming Between Wireless Networks," filed Jul. 1, 2002, the contents of which are specifically incorporated in its entirety herein by reference.

A. Exemplary CDMA Communication

CDMA is a wireless communication system for a popular digital, spread spectrum, cellular phone service. The CDMA protocol family includes not only CDMA, but also cdmaOne and CDMA2000. Unless otherwise stated to the contrary, for purposes of the present application, a reference to CDMA includes the cdmaOne and CDMA2000 wireless communication technologies (including all of their standard communication protocols), as well as any future wireless communication technologies based on CDMA2000. One can refer to the CDMA standards (e.g., TIA/EIA IS-2000 series) published by the Telecommunications Industry Association (TIA) for more information on CDMA technology, communication protocols, and components. It should also be understood that unless stated to the contrary, standard CDMA components are used with the present embodiments.

CDMA includes a suite of airlink, radio network, and Internet Protocol (IP) standards that allow IP network access by cellular devices (i.e., mobile nodes). In the present embodiment, the mobile node 12 may gain network access by negotiating with a base station system 14 for an airlink channel. The base station system 14 may include an antenna, such as a radio tower, for sending and/or receiving the CDMA signals, though other transmission mechanisms may alternatively be utilized. Additionally, it should be understood that the base station system 14 may include other standard CDMA components, such as a base station controller (BSC) and/or a mobile switching center (MSC).

Once an airlink channel is allocated, a BSC within the base station system 14 may use an interface, such as an A8/A9 interface, to set up a packet data session with an interface node 20 (e.g., packet control function (PCF)). The interface node 20 may be implemented in software, hardware, or a combination of both. Additionally, or alternatively, the interface node 20 may be part of the UWAG 60 or the base station system 14.

Furthermore, the interface node 20 may use another interface, such as an A10/A11 or radio access network (RAN)—packet data serving node (PDSN) interface (R-P interface), to set up a packet data session with the UWAG 60. As will be described later, the UWAG 60 may include functionality for a PDSN that can be used for processing CDMA data.

In the present embodiment, the mobile node 12 can then initiate a Point-to-Point Protocol (PPP) session that is terminated at the UWAG 60. IP traffic can be carried over the PPP session and transferred between the mobile node 12 and the UWAG 60. The UWAG 60 may also responsible for relaying IP traffic to the network 70, which may include an IP network such as the Internet. For more information on PPP, one can refer to RFC 1661, the contents of which are specifically incorporated in its entirety herein by reference.

B. Exemplary 802.11 Communication

IEEE 802.11 is a popular wireless access technology that allows Ethernet-like media framing over the 2.4 GHz wireless spectrum. Like wireline Ethernet (also referred to herein as IEEE 802.3 or simply 802.3), there is no admission control and carrier sense multiple access (CSMA) is used. However, where IEEE 802.3 uses collision detection, IEEE 802.11 (also referred to herein as wireless Ethernet or simply 802.11), uses collision avoidance, such as by including in every frame sent the duration of the frame in units of time. Once an 802.11 station sends a frame, other 802.11 stations may avoid transmitting until the time duration specified within the frame has expired.

Furthermore, 802.11 packets may use the same format as 802.3 packets and can thus be passed from a wireless Ethernet to wireline Ethernet setting via an 802.11 access point, such as the 802.11 access point 30 shown in FIG. 1. In the present embodiment, the 802.11 access point 30 may forward data received from the mobile node 12 to the UWAG 60. Furthermore, as will be described later, the UWAG 60 may include functionality typically performed by an 802.11 roaming gateway, which generally receives and processes 802.11 data. For more information on wireless Ethernet, one can refer to the Institute for Electrical and Electronics Engineers (IEEE) standards 802.11a, 802.11b, and 802.11g, the contents of which are specifically incorporated in their entirety herein by reference.

Authentication in 802.11 networks may be performed in a number of ways. Relatively simple mechanisms based on user identification/password pairs can be used for authenticating a mobile node. Additionally, 802.11 networks may employ 802.1x, which is a port-based authentication protocol for IEEE 802 networks. 802.11x allows a client (e.g., mobile node 12), access point (e.g., 802.11 access point 30), and authentication server (e.g., authentication server 90) to work together to authenticate the client for network access. 802.1x typically uses an extensible authentication protocol (EAP) to exchange authentication information. EAP allows the use of varied authentication mechanisms and parameters, such as one-time passwords, Kerberos, Transparent LAN service (TLS), and other mechanisms. For more information on EAP, one can refer to RFC 2284, the contents of which are specifically incorporated in its entirety herein by reference.

C. Exemplary GSM Communication

Another wireless access technology that may be used in the exemplary wireless telecommunications network 10 is Global System for Mobile Communications (GSM), which typically uses narrowband TDMA signals for wirelessly transmitting data. The GSM protocol family includes not only GSM, but also General Packet Radio Service (GPRS) and Universal Mobile Telecommunications System (UMTS). Unless otherwise stated to the contrary, for purposes of the present application, a reference to GSM includes GPRS/UMTS (including all of their standard communication protocols), as well as any future wireless communication technologies based on GPRS/UMTS. Additionally, other GSM standards, such as Enhanced Data Rates for GSM Evolution (EDGE), and third generation GSM services (3GSM), may also be used with the present embodiments. For more information on GSM technology, communication protocols, and components, one can refer to the GSM standards published by the European Telecommunications Standards Institute (ETSI).

Despite their technological differences, GSM and CDMA can operate in a similar fashion. Instead of a PDSN and a PCF, GSM can use a Gateway GPRS Support Node (GGSN) and a Serving GPRS Support Node (SGSN), respectively. Also, rather than an R-P interface, GSM can use a GPRS Tunneling Protocol (GTP) interface. Thus, as shown in FIG. 1, the mobile node 12 may communicate with the UWAG 60 via an interface node 40, which may be an SGSN. Additionally, as will be described later, the UWAG 60 may include functionality typically performed by a GGSN. It should be understood that unless stated to the contrary, standard GSM components are used with the present embodiments, and that GSM technology and its components may be readily substituted for CDMA technology and its components in connection with the present embodiments.

D. Exemplary Handoffs Between Different Wireless Access Technologies

In the present embodiment, a handoff may occur when the mobile node 12 switches to a different wireless access technology or switches to a different UWAG from the one it is currently using. Two types of handoffs that may be performed within the exemplary wireless telecommunications network 10 are intra-UWAG handoffs and inter-UWAG handoffs. In an intra-UWAG handoff, the UWAG with which a mobile node communicates may remain the same, but the mobile node may roam to a network that employs a different wireless access technology. To illustrate, an intra-UWAG handoff may occur if the mobile node 12 originally communicates with the UWAG 60 using CDMA (e.g., via the base station system 14 and interface node 20), but then switches and begins using wireless Ethernet (e.g., via the 802.11 access point 30). In such a scenario, the UWAG 60 may have to dynamically change the type of framing that is used by the mobile node 12.

In an inter-UWAG handoff, a mobile node 12 may cease communication with a UWAG and roam to a new UWAG. In such a scenario, a hard handoff may occur, which implies that the connection to the old UWAG may be broken before a connection to the new UWAG is made. Additionally, the hard handoff may be followed by a Mobile IP handoff, which implies the mobile node accesses a new foreign agent within the new UWAG as opposed to the old foreign agent within the old UWAG.

Alternatively, in an inter-UWAG handoff situation, the wireless network 10 may employ a deferred handoff. During a deferred handoff, a mobile node may remain in communication with the serving (old) UWAG while traffic is tunneled via the new UWAG to and from the mobile node. When the mobile node's user session goes dormant or is idle for a period of time, the new UWAG may complete the deferred handoff by terminating the tunnel to the old UWAG and sending a Mobile IP agent advertisement to the mobile node so that it will be triggered to perform a Mobile IP handoff to a new foreign agent within the new UWAG.

III. Exemplary Environment Access Module

Figure 2:
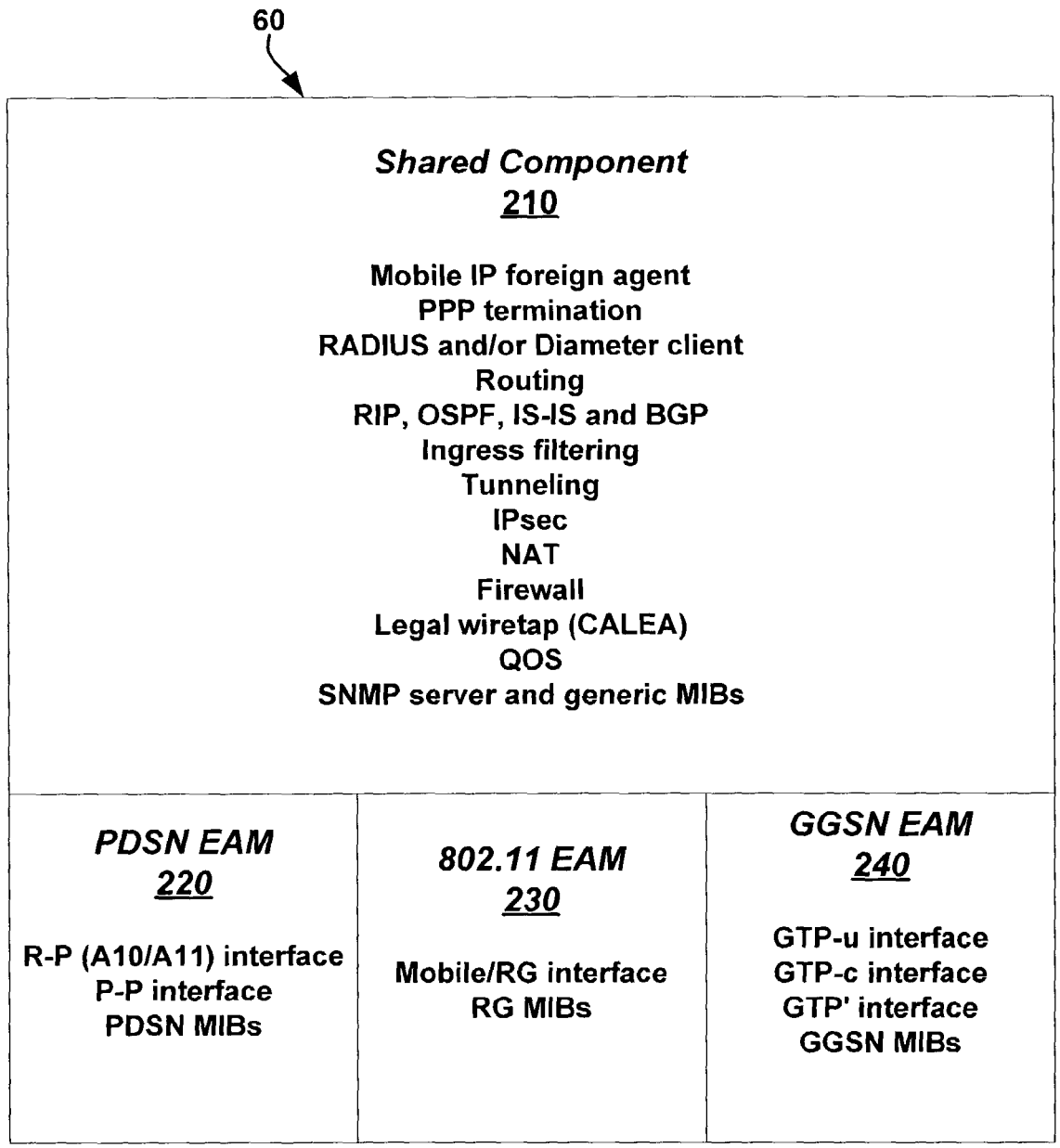
FIG. 2 shows a functional block diagram of an exemplary universal wireless access gateway (UWAG) for use in the wireless telecommunications network of FIG. 1.

Turning now to FIG. 2, a block diagram illustrating exemplary functional components within the UWAG 60 is shown. In the present embodiment, the UWAG 60 may include a shared component 210, and a number of protocol-specific EAMs, such as a PDSN EAM 220, an 802.11 EAM 230, and a GGSN EAM 240. The shared component 210 may include functionality that is common to a number of different wireless access technologies. The protocol-specific EAMs may include functionality that is specific to a respective wireless access technology (e.g., the 802.11 EAM may include functionality specific to the 802.11 access technology).

Additionally, although not shown in FIG. 2, it should be understood that the UWAG 60 may include a storage unit that uses any known storage mechanism, such as a magnetic or optical hard disk drive, buffer, or memory unit (e.g., random access memory (RAM), read-only memory (ROM), programmable ROM (PROM), erasable PROM (EPROM), electrically erasable PROM (EEPROM)). As will be described later, various data structures used for storing data pertaining to the mobile node 12 may be kept within the storage unit of the UWAG 60. Furthermore, the UWAG 60 may also include a central processing unit (CPU) for processing data received from the mobile node 12 and/or other components within the wireless network 10.

A. Exemplary Shared Component

The shared component 210 may include functionality that is common to any number of different wireless access technologies, such as CDMA, 802.11, and GSM. For example, the present shared gateway 210 may support Mobile IP and thus include a foreign agent that communicates with the home agent 80. Additionally, the shared component 210 may support various framing and encapsulating protocols, such as the point-to-point protocol (PPP). The shared component 210 may also include various security functionality, such as Internet Protocol Security (IPsec), firewalls, and ingress filtering, all of which may prevent unauthorized clients from accessing the network 70.

Various authentication mechanisms, such as RADIUS and Diameter, may also be included within the shared component 210. The shared component 210 may also have a number of different addressing and routing mechanisms, such as the Routing Information Protocol (RIP), Open Shortest Path First (OSPF) routing protocol, Intermediate System to Intermediate System (IS—IS) routing protocol and Border Gateway Protocol (BGP). Furthermore, the shared component 210 may also support other miscellaneous functionality, such as Simple Network Management Protocol (SNMP) servers and generic Management Information Bases (MIBs), legal wiretapping under the Communications Assistance for Law Enforcement Act (CALEA), network address translation (NAT), and Quality of Service (QoS). It should be understood that the functionality described here is merely exemplary, and that the shared component 210 may alternatively include different functionality than specified here. Additionally, it should be understood that any functionality within the shared component 210 may be implemented in hardware, software, or a combination of both.

B. Exemplary Protocol-Specific EAMs

As shown in FIG. 2, the UWAG 60 may also include any number of different protocol-specific EAMs. These EAMs may serve as pluggable modules to the shared component 210 via various application program interfaces (APIs). Additionally, these EAMs may enable the mobile node 12 to roam and communicate with networks using different wireless access technologies.

The PDSN EAM 220 may have a number of functions that are specific to PDSNs. Hence, the UWAG 60 may perform the functionality of a PDSN as used in a CDMA network. In particular, the PDSN EAM 220 may enable the UWAG 60 to support R-P (A10/A11) interfaces, and PDSN to PDSN (P-P) interfaces. Furthermore, the PDSN EAM 220 may enable the UWAG 60 to store PDSN MIBs, which may include a variety of different types of data. In particular the PDSN MIBs may include management information that a network service provider administering the network 70 may wish to collect about the PDSN EAM 220.

The 802.11 EAM 230 may perform functionality specific to an 802.11 roaming gateway. For example, the 802.11 EAM 230 may support various mobile node to gateway interfaces, which may be based on Mobile IP, RADIUS and/or Diameter protocols. Additionally, the 802.11 EAM 230 may also include roaming gateway MIBs usually present within 802.11 roaming gateways.

The GGSN EAM 240 may include any number of functions specific to GSN networks and GGSN components. For example, the GGSN EAM 240 may enable the UWAG 60 to support various GSM interfaces, such as GTP-u interfaces, GTP-c interface, and GTP' interface. Additionally, the GGSN EAM 240 may also include GGSN MIBs usually present within standard GGSNs.

It should be understood that in the present embodiments, more that one protocol-specific EAM may be active simultaneously. Thus, the mobile node 12 may roam between networks that use different wireless access technologies, or the mobile node 12 may use multiple wireless access technologies at the same time. Additionally, the UWAG 60 can be implemented such that the protocol-specific EAMs 220, 230, 240 are part of a software bundle, and that only certain ones are activated at a certain time, based on software keys. For example, if a customer only buys the software keys for the PDSN EAM 220 and the 802.11 EAM 230, they will not be able to operate the system as a GGSN EAM 240 without also purchasing its respective software key.

IV. Exemplary Data Structures for Use with an EAM

Figure 3:
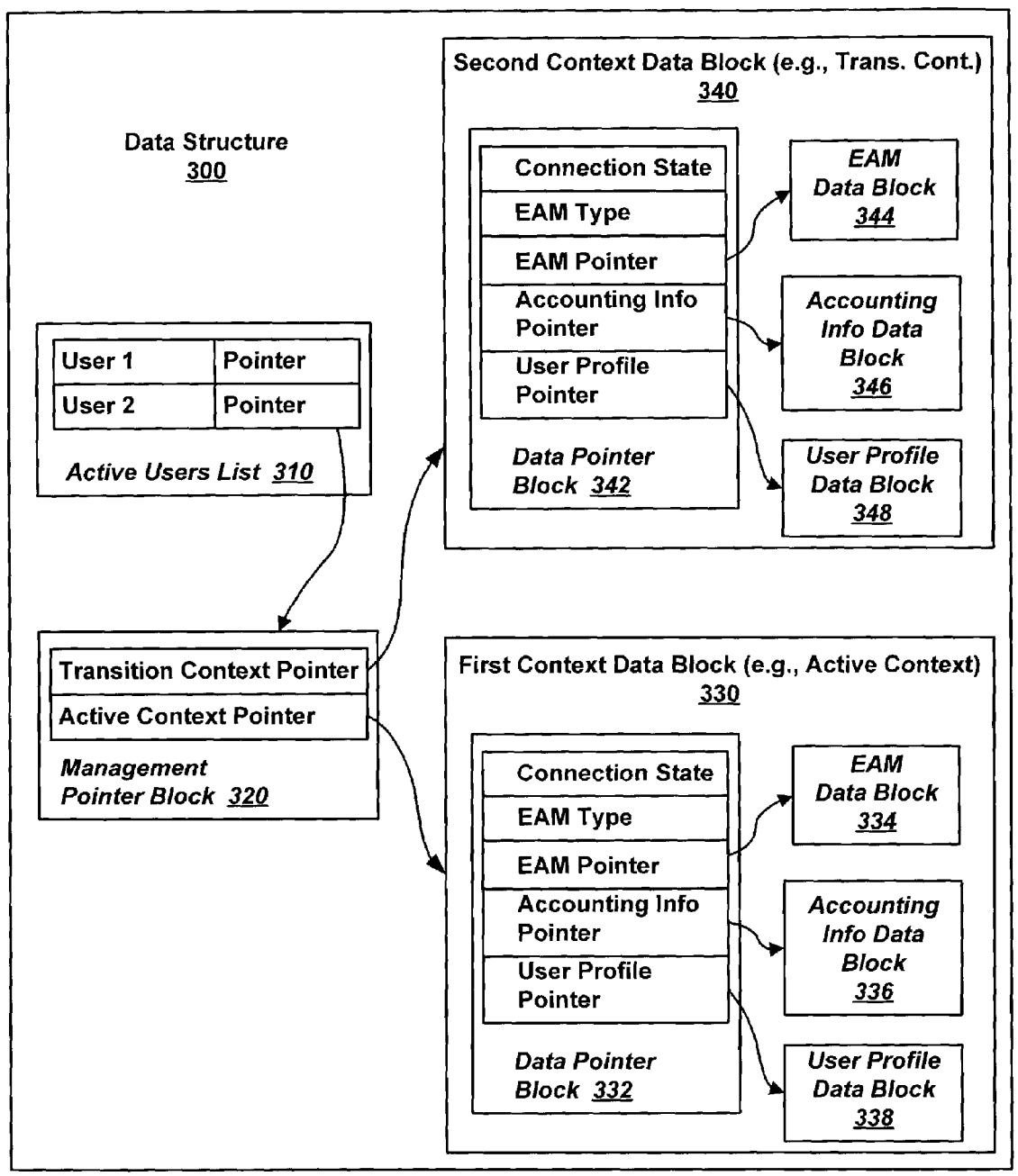
FIG. 3 shows a block diagram of an exemplary data structure for use with the UWAG of FIG. 2.

FIG. 3 shows an exemplary data structure 300 that may be stored within the UWAG 60 or another component (e.g., external database) in communication with the UWAG 60. The data structure 300 may keep track of data associated with the current wireless access technology being used by the mobile node 12. Furthermore, if the mobile node 12 performs a handoff causing it to use a new wireless access technology, the data structure 300 may keep track of data associated with the new (transition) access technology that will be used by the mobile node 12.

As depicted in FIG. 3, the data structure 300 may include any number of data blocks that are linked to one another by various pointers. In the present embodiment, the data structure 300 may include an active users list 310, a management pointer block 320, a first context data block 330 and a second context data block 340.

A. Exemplary Active Users List

The active users list 310 may correlate usernames or hardware identifiers (e.g., for mobile nodes) to pointers. Each pointer may then link to a management pointer block, such as the management pointer block 320. Thus, each mobile node that accesses the UWAG 60 may have a corresponding management pointer block. To illustrate, in the present embodiment, the mobile node 12 may correspond to user 2 within the active user list 310. As shown in FIG. 2, the pointer associated with user 2 links to the management pointer block 320. It should be understood that the active users list 310 may list any number of users, and that any number of pointers may be associated with each user. Furthermore, data included within other data blocks inside the data structure 300 may alternatively be stored within the active users list 310 and directly correlate to a username or hardware identifier.

B. Exemplary Management Pointer Block

A management pointer block may include a pointer that links to data associated with the specific wireless access technology or "context" in which a corresponding mobile node is operating. Additionally, a management pointer block may have a pointer that links to the data associated with a new (transition) wireless access technology that will be used when the mobile node performs a handoff.

To illustrate, in the exemplary data structure 300, the management pointer block 320 may have an active context pointer that points to data associated with an active context (e.g., wireless access technology) that is being used by the mobile node 12. Additionally, the management pointer block 320 may also include a transition context pointer which points to data associated with a transition context to which the mobile node 12 is switching.

The transition context pointer may point to a NULL value if no transition (e.g., handoff) is taking place. Additionally, the active context pointer may point to a NULL value if a wireless access technology is currently not in use, such as when the mobile node 12 is first turned on.

In the present embodiment, the exemplary active context pointer within the management pointer block 320 may point to a first context data block 330. The first context data block 330 may include data associated with the current wireless access technology used by the mobile node 12, which may be, for example, wireless Ethernet. Additionally, the exemplary transition context pointer within the management pointer block 320 may point to a second context data block 340. The second context data block 340 may include data associated with a new wireless access technology (e.g., CDMA2000) that the mobile node 12 seeks to utilize.

As will be described shortly, the pointers within the management pointer block 320 may switch the data blocks to which they point, depending on the state of the mobile node 12. Furthermore, it should be understood that alternatively, the management pointer block 320 may include more or fewer pointers, or that data stored within the first and/or second context data blocks 330, 340 may instead be incorporated within the management pointer block 320.

C. Exemplary Context Data Blocks

As described earlier, the first and second context data blocks 330, 340 may include data relating to active and transition contexts of the mobile node 12. In the present embodiment, the first context data block 330 may include a data pointer block 332, an EAM data block 334, an accounting information data block 336, and a user profile data block 338. Similarly, the second context data block 340 may include a data pointer block 342, an EAM data block 334, an accounting information data block 346, and a user profile data block 348.

i. Exemplary Data Pointer Blocks

As depicted in FIG. 3, the data pointer blocks 332, 342 may include a set of pointers (e.g., EAM pointers, accounting information pointers, user profile pointers, etc.) that link to other data blocks 334–338 and 344–348 within the first and second context data blocks 330, 340, respectively. Additionally, each of the data pointer blocks 332, 342 may also include an EAM type block that describes the type of wireless access technology employed by the corresponding context data block 330, 340. To illustrate, the EAM type block within the data pointer block 332 may indicate "wireless Ethernet" if the mobile node 12 is currently using wireless Ethernet. Furthermore, the EAM type block within the data pointer block 342 may be "CDMA2000" if the mobile node 12 is transitioning to a CDMA2000 network.

Furthermore, each of the data pointer blocks 332, 342 may hold a connection state block that describes the current connection state (e.g., active operation, idle operation, etc.) for the corresponding context data block 330, 340.

ii. Exemplary EAM Data Blocks

In the present embodiment, the exemplary EAM data blocks 334, 344 may store data attributes that are specific to the wireless access technologies represented by the context data blocks 330, 340, respectively. For example, in the present embodiment, if the mobile node 12 is actively using wireless Ethernet, the EAM data block 334 may include data related to wireless Ethernet. Similarly, if the mobile node 12 is roaming and seeks to use a different wireless protocol, such as CDMA2000, the EAM data block 344 within the transition context block may include data related to CDMA2000.

Thus, the actual data stored within the EAM data blocks 334, 344 may depend on the access technologies that the mobile node 12 is employing and/or transitioning to. For example, if the mobile node 12 is using and/or transitioning to an access technology that typically requires PPP, such as CDMA2000 or UMTS, the corresponding EAM data block may include, for example, connection identification(s), the compression types (if any) being used, authorization information, protocol setup/tear-down phases and states, and/or retry and timeout values.

Alternatively, if the mobile node 12 is using and/or transitioning to an access technology that typically does not require framing, such as 802.11 or GPRS, the corresponding EAM data block may include, for example, protocol setup/tear-down phases and states, dynamic host configuration protocol (DHCP) related information, ARP related information, various network addresses (e.g., for the 802.11 access point 30), and/or the compression types (if any) being used. It should be understood that more or fewer data attributes may be included within the EAM data blocks 334, 344, and that the discussion here merely illustrates an exemplary embodiment.

iii. Exemplary Generic Data Blocks

As shown in FIG. 3, the first and second context data blocks 330, 340 may also include generic data blocks that provide information about the mobile node 12 that is not dependent on the type of wireless access technology that is being utilized. To illustrate, both context data blocks 330, 340 may include accounting information data blocks 336, 346, respectively. The accounting information data blocks 336, 346 may include information such as accounting identifications, the number of the packets and bytes transmitted and received by the mobile node 12, pre-paid billing information for the mobile node 12 (if appropriate), timestamps for connection times and connection durations of the mobile node 12, and so forth. Furthermore, the context data blocks 330, 340 may also include user profile data blocks 338, 348, respectively, which contain user profile information such as a name, email address, and other such data that may be returned from the authentication server 90 during the authentication of the mobile node 12.

It should be understood that any number of other generic data blocks may be included within the first and second context data blocks 330, 340. For example, generic data blocks providing information about the data transfer history of the mobile node 12 may alternatively be included within the context data blocks 330, 340.

D. Exemplary Data Block Sharing

Figure 4:
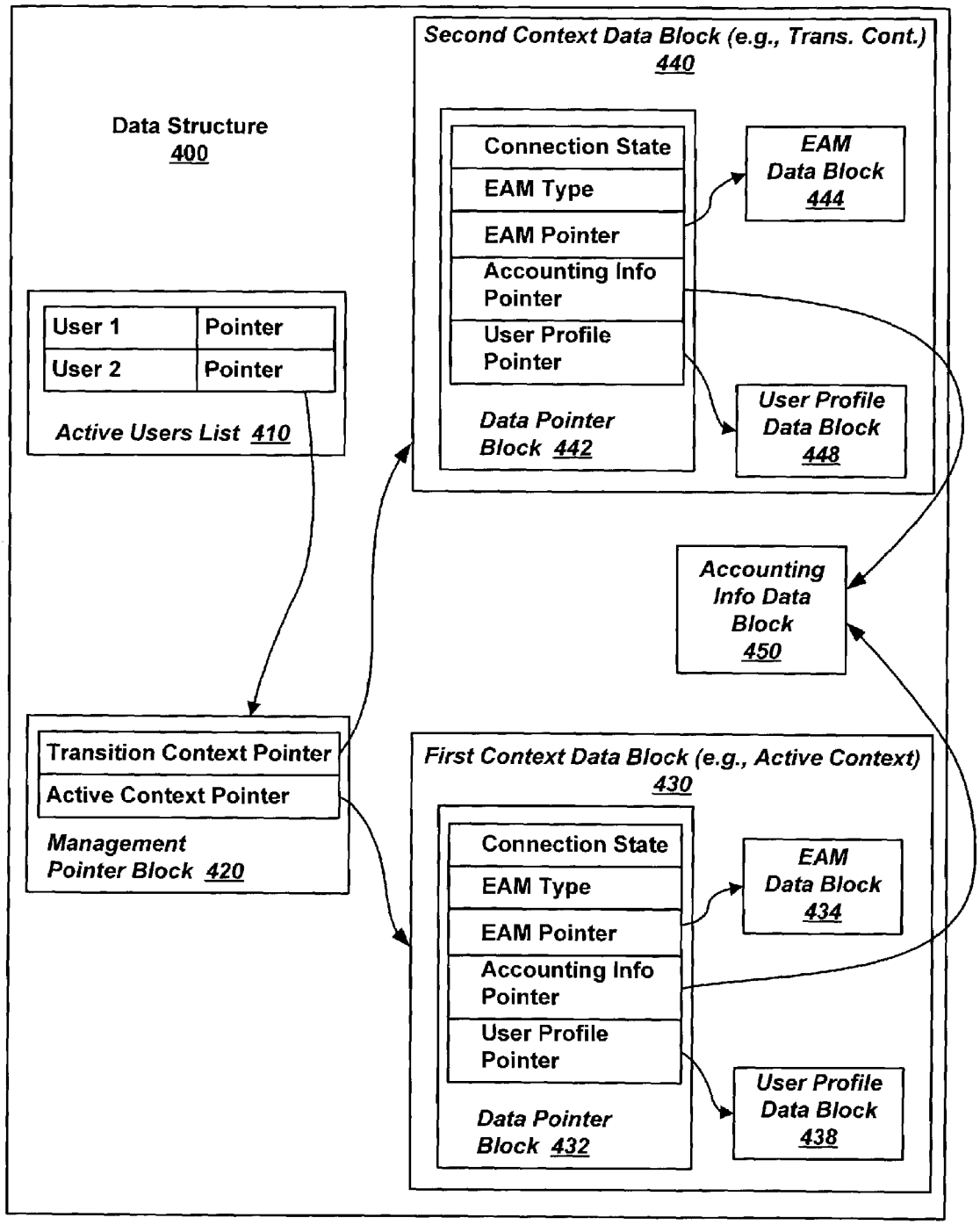
FIG. 4 shows a block diagram of another exemplary data structure for use with the UWAG of FIG. 2.

In alternate embodiments, pointers within various blocks may point to the same data block in order to save memory space. For example, FIG. 4 shows another exemplary data structure 400 for use with the UWAG 60 that illustrates this point. The data structure 400 may include an active data list 410, management pointer block 420, first context data block 430, and second context data block 440, all of which may be substantially similar to their respective components 310, 320, 330, 340 within the previous data structure 300. In the present data structure 400, however, the accounting information blocks 336, 346 may be replaced by a single accounting information block 450. Thus, the accounting information pointer within each of the shared data blocks 432, 442 may point to the same accounting information block 450. Such a mechanism may prevent duplicate data from taking up space in memory when two context data blocks share the same information. It should be understood from this example that any of the data blocks within the data structure 300 (e.g., user profile data blocks 438, 448) may be shared or linked to by more than one pointer.

It should be further understood that in alternate embodiments, the data structures 300, 400 may include more or fewer data blocks that may be implemented in different ways. For example, an alternate data structure may also include a third context data block to keep track of previous contexts used by the mobile node 12. Additionally, in an alternate embodiment, the data blocks may be implemented within a single linear data block as opposed to being connected via pointers. Furthermore, each of the blocks within the data structures 300, 400 may be implemented using hardware, software, or a combination of both.

Additionally, in an alternate embodiment, during the setup of a new context data block (e.g., corresponding to a new wireless access technology), the UWAG 60 may wait for a threshold delay period before tearing down the old context data block (e.g., corresponding to an old wireless access technology). Thus, during the threshold delay period, the UWAG 60 and the mobile node 12 may communicate via the old and the new wireless access technologies. This mechanism may be useful if a new wireless access technology being employed is not yet fully stable shortly after a handoff has been performed.

V. Exemplary Switching Between Different Wireless Access Technologies

Figure 5A:
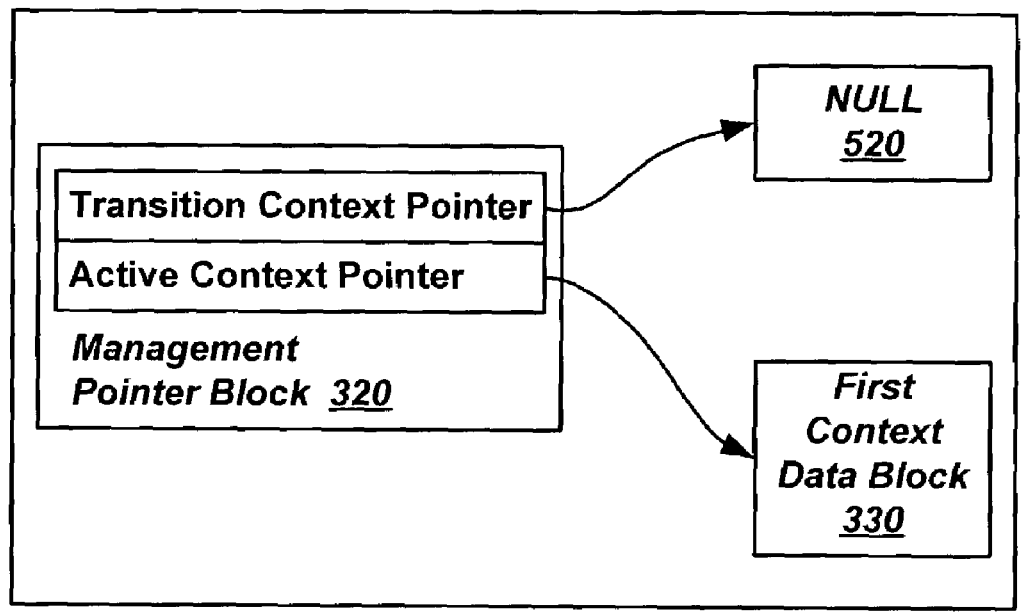
FIGS. 5a–d show exemplary data structures illustrating switching between different wireless access technologies within the UWAG of FIG. 2.

FIGS. 5a–d show an exemplary embodiment of the UWAG 60 switching its active data block during a handoff to a different wireless access technology. In FIG. 5a, the active context pointer within the management pointer block 320 points to the first context data block 330, which may correspond to, for example, a wireless Ethernet technology. Thus, the UWAG 60 and the mobile node 12 may be communicating using wireless Ethernet at this time.

Additionally in FIG. 5a, the mobile node 12 is not in a potential handoff situation or transition state. Thus, the transition context pointer within the UWAG 60 may point to a NULL value 520, indicating that a transition to a new wireless access technology is not occurring because other wireless access technologies are not available or desirable to the mobile node 12 at this time.

Figure 5B:
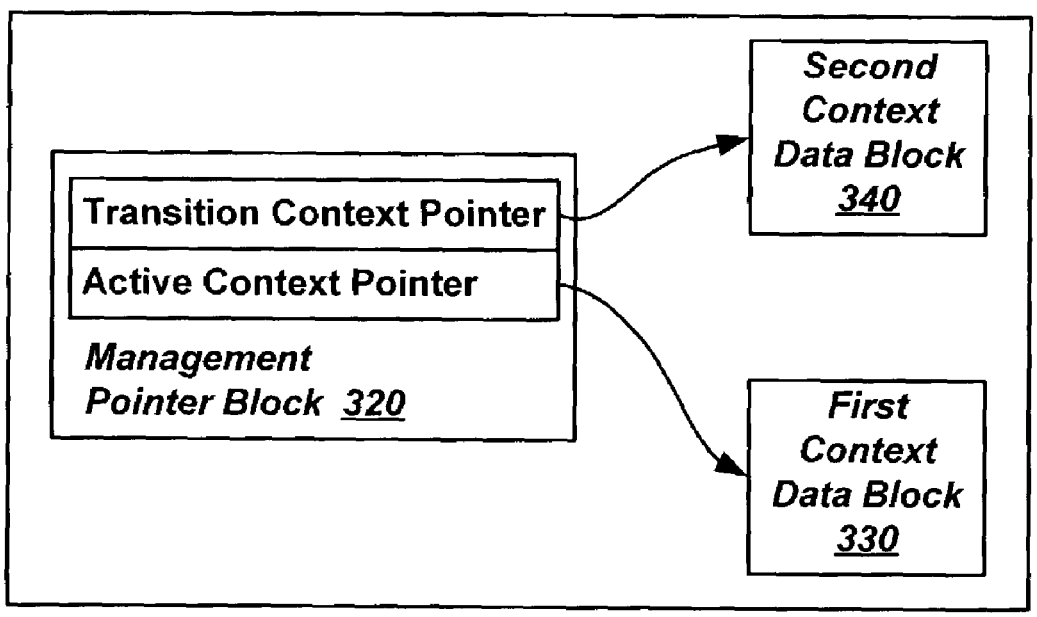

FIG. 5b shows when the mobile node 12 is roaming and encounters a viable wireless access technology (e.g., corresponding to the second context data block 340) that is different than the one specified by the active context pointer (e.g., the first context data block 330). In such a scenario, the mobile node 12, the UWAG 60, and/or another component within the wireless telecommunications network 10 may decide to perform a handoff to the new wireless access technology. Hence, in the present embodiment, the UWAG 60 may instruct the transition context pointer within the management pointer block 320 to link to the second context data block 340, which may correspond to, for example, a CDMA2000 technology. As shown in FIG. 5b, the active context pointer may still point to the first context data block 330, indicating that the mobile node 12 is still using wireless Ethernet at this time.

Figure 5C:
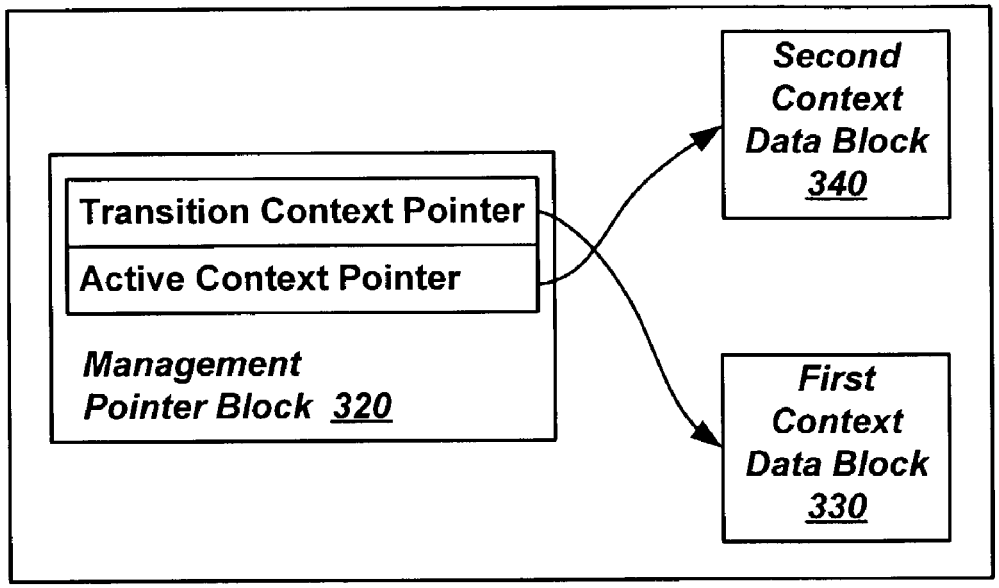
Figure 5D:
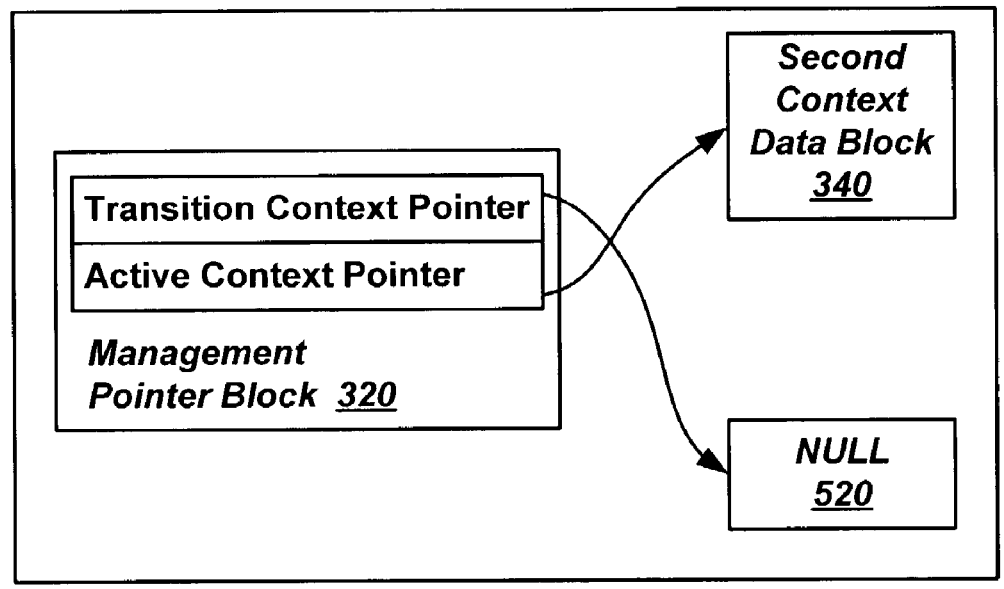

In FIG. 5c, the transition context pointer and the active context pointer may swap the data blocks to which they point. Thus, the transition context pointer may now point to the first context data block 330 (e.g., corresponding to wireless Ethernet), and the active context pointer may point to the second context data block 340 (e.g., corresponding to CDMA2000). Thus, the mobile node 12 may now communicate with the UWAG 60 using the wireless access technology specified within the second context data block 340 (e.g., CDMA2000). Furthermore, since the handoff to the new wireless access technology is complete (i.e., the active context pointer has now been switched to point to the second context data block 340), the transition pointer may now be switched to point back to the NULL value, as shown in FIG. 5d.

Thus, the present paradigm enables a new wireless access technology to be set up before an old wireless access technology is torn down. After a new wireless access technology has been set up and the transition context pointer links to it, the active and transition context pointers may switch, and the old context data block (now pointed to by the transition context pointer) may be torn down on the side. Thus, the present embodiments may allow for a "seamless" handoff between a first wireless access technology and a second wireless access technology within a mobile node.

It should be further understood that the present UWAG 60 may support any number of calls from any number of mobile nodes simultaneously, and that the UWAG 60 may allocate bandwidth between the mobile nodes depending on the types of calls received. To illustrate, the UWAG 60 may, for example, statically allocate 50% of its capacity towards calls involving 802.11, 30% of its capacity towards calls involving CDMA2000, and 20% of its capacity towards calls involving GPRS or UMTS. Alternatively, the UWAG 60 may perform dynamic bandwidth allocation depending on any number of different factors, such as the time of day, priority of calls received, available network resources, and so forth.

The present embodiments may include a number of advantages. Allowing the smooth transition from one wireless access technology to another enables the mobile node 12 to roam to different areas that use different wireless technologies. Furthermore, the present embodiments enable a mobile node to roam between access technologies that have different framing requirements, such as those that typically require PPP (e.g., CDMA2000 and UMTS) and those that typically do not require framing (e.g., 802.11 and GPRS).

Additionally, the present embodiments may enable a mobile node 12 or other network component to choose the most suitable wireless access technology to use at any given time. To illustrate, the mobile node 12, UWAG 60, or other network component may evaluate any number of different factors, such as the type of application being run, the strength and cost of various available wireless technologies, and the desired call framing parameters, to determine which wireless access technology to use.

It should be understood that a wide variety of additions and modifications may be made to the exemplary embodiments described within the present application. For example, any of the components within the wireless telecommunications network 10 may be implemented using software, hardware, and/or a combination of the two. It is therefore intended that the foregoing description illustrates rather than limits this invention and that it is the following claims, including all of the equivalents, which define this invention:

What is claimed is:

1. A method for seamlessly roaming between different wireless access technologies, the method comprising:
   providing a universal wireless access gateway with a shared component and a first environment access module to establish a first wireless connection with a first network;
   communicating with the first network along the first wireless connection using a first wireless access technology;
   providing the universal wireless access gateway with a second environment access module;
   establishing a second wireless connection between the universal wireless access gateway and a second network using the shared component and the second environment access module; and
   communicating with the second network along the second wireless connection using a second wireless access technology that differs from the first wireless access technology.

2. The method of claim 1, wherein the first wireless access technology and the second wireless access technology comprise at least one of a wireless Ethernet technology, a Code-Division Multiple Access technology and a Global System for Mobile Communications technology.

3. The method of claim 1 further comprising terminating the first wireless connection with the first network.

4. The method of claim 3, wherein the step of terminating the first wireless connection occurs after the step of establishing the second wireless connection.

5. The method of claim 1 further comprising switching seamlessly from communicating using the first wireless access technology to using the second wireless access technology.

6. The method of claim 1, wherein the shared component includes functionality common to the first wireless access technology and the second wireless access technology.

7. The method of claim 1, wherein the first environment access module includes functionality specific to the first wireless access technology, and the second environment access module includes functionality specific to the second wireless access technology.

8. The method of claim 1 further comprising linking an active context pointer to a first context data block storing data associated with the first wireless access technology.

9. The method of claim 8 further comprising linking a transition context pointer to a second context data block storing data associated with the second wireless access technology.

10. The method of claim 9 further comprising switching the active context pointer and the transition context pointer.

11. The method of claim 1, wherein the first wireless access technology and the second wireless access technology use different framing mechanisms.

12. The method of claim 11, wherein the first wireless access technology uses an Internet Protocol with a Pointto-Point Protocol and the second wireless access technology uses an Internet Protocol without the Point-to-Point Protocol.

13. The method of claim 11, wherein the second wireless access technology uses an Internet Protocol with a Point-to-Point Protocol and the first wireless access technology uses an Internet Protocol without the Point-to-Point Protocol.

14. The method of claim 1, wherein a third network comprises the first network and the second network.

15. The method of claim 1 further comprising a computer readable medium having stored therein instructions for causing a processor to execute the steps of the method of claim 1.

16. A universal wireless access gateway comprising:
   a shared component;
   a first environment access module that communicates with the shared component to enable access to a first network using a first wireless access technology; and
   a second environment access module that communicates with the shared component to enable access to a second network using a second wireless access technology that differs from the first wireless access technology.

17. The universal wireless access gateway of claim 16, wherein the first wireless access technology comprises a wireless Ethernet technology, and the second wireless access technology comprises a Code-Division Multiple Access technology.

18. The universal wireless access gateway of claim 16 further comprising a third environment access module that communicates with the shared component to enable access to the network that uses a third wireless access technology.

19. The universal wireless access gateway of claim 18, wherein the first wireless access technology comprises a wireless Ethernet technology, the second wireless access technology comprises a Code-Division Multiple Access technology and the third wireless access technology comprises a Global System for Mobile Communications technology.

20. The universal wireless access gateway of claim 16, wherein the shared component includes functionality common to the first wireless access technology and the second wireless access technology.

21. The universal wireless access gateway of claim 16, wherein the first environment access module includes functionality specific to the first wireless access technology, and the second environment access module includes functionality specific to the second wireless access technology.

22. The universal wireless access gateway of claim 16, wherein the first wireless access technology and the second wireless access technology use different framing mechanisms.

23. The universal wireless access gateway of claim 16, wherein a mobile node uses the universal wireless access gateway to communicate with at least one of the first network and the second network.

24. The universal wireless access gateway of claim 23, wherein an authentication server communicates with the universal wireless access gateway while authenticating the mobile node.

25. The universal wireless access gateway of claim 16, wherein the universal wireless access gateway performs functionality specific to a packet data serving node and an 802.11 roaming gateway.

26. A method for seamlessly roaming between different wireless access technologies within a universal wireless access gateway, the method comprising:
   linking an active context pointer to a first context data block associated with a first wireless access technology;
   providing the universal wireless access gateway with a shared component and a first environment access module to establish a first wireless connection with a first network;
   communicating with the first network along the first wireless connection using the first wireless access technology;
   providing the universal wireless access gateway with a second environment access module that is linked to the shared component;
   linking a transition context pointer to a second context data block corresponding to a second wireless access technology that differs from the first wireless access technology;
   switching the active context pointer and the transition context pointer;
   establishing a second wireless connection between the universal wireless access gateway and a second network using the shared component and the second environment access module; and
   communicating with the second network along the second wireless connection using the second wireless access technology.

27. The method of claim 26, wherein the first wireless access technology and the second wireless access technology comprise at least one of a wireless Ethernet technology, a Code-Division Multiple Access technology and a Global System for Mobile Communications technology.

28. The method of claim 26 further comprising terminating the first wireless connection with the first network.

29. The method of claim 26, wherein the shared component includes functionality common to the first wireless access technology and the second wireless access technology.

30. The method of claim 26, wherein the first environment access module includes functionality specific to the first wireless access technology, and the second environment access module includes functionality specific to the second wireless access technology.

31. The method of claim 26, wherein the first wireless access technology and the second wireless access technology use different framing mechanisms.

* * * * *